(12) United States Patent
Rickert et al.

(10) Patent No.: US 7,062,897 B2
(45) Date of Patent: Jun. 20, 2006

(54) GATHERING AND PICKING DEVICE

(75) Inventors: Clemens Rickert, Stadtlohn (DE); Dirk Bongert, Stadtlohn (DE)

(73) Assignee: Maschinenfabrik Kemper GmbH & Co KG, Stadtlohn (DE)

( * ) Notice: Subject to any disclaimer, the term of this patent is extended or adjusted under 35 U.S.C. 154(b) by 0 days.

(21) Appl. No.: 10/733,930

(22) Filed: Dec. 11, 2003

(65) Prior Publication Data
US 2004/0144074 A1    Jul. 29, 2004

(30) Foreign Application Priority Data
Dec. 11, 2002  (DE)  ............................. 102 57 776

(51) Int. Cl.
*A01D 45/02*    (2006.01)
(52) U.S. Cl. .................................... 56/103
(58) Field of Classification Search .......... 56/51, 56/52, 64, 65, 103, 104, 105, 109, 113, 116, 56/117, 119
See application file for complete search history.

(56) References Cited
U.S. PATENT DOCUMENTS 3,707,833 A * 1/1973 Sutton ..................... 56/104
3,858,384 A * 1/1975 Maiste et al. ............. 56/14.2
4,211,059 A * 7/1980 Decoene .................... 56/94
4,377,062 A    3/1983 Slattery .................... 56/14.3
5,546,737 A * 8/1996 Moosbrucker ............... 56/94
5,916,113 A * 6/1999 Johnson ..................... 56/94
6,119,443 A * 9/2000 Rauch ....................... 56/64
6,226,969 B1 * 5/2001 Becker ...................... 56/62
6,430,907 B1 * 8/2002 Wolters et al. ............. 56/64
2001/0003237 A1  6/2001 Wolters et al. ............. 56/64
2002/0014064 A1 * 2/2002 Wubbels et al. ............ 56/95

FOREIGN PATENT DOCUMENTS

| DE | 100 28 887 A1 | 12/2001 |
| EP | 0 267 700 | 5/1988 |
| FR | 2 599 931 | * 6/1987 |
| GB | 1046196 | 10/1966 |

* cited by examiner

Primary Examiner—Árpád Fábián Kovács

(57) ABSTRACT

A gathering and picking device having a gathering element arranged on a first side of a picking gap. The gathering element is rotated about a predominantly vertical axis and is provided with carrier elements arranged to grasp standing plants and to introduce them into the picking gap in cooperation with a conveying element. The conveying element is arranged upstream and above the inlet of the picking gap on the side of the picking gap opposite from the gathering element. A picking unit is operable to move the plants downwardly through the picking gap, such that useful parts of the standing plants are separated.

15 Claims, 2 Drawing Sheets

GATHERING AND PICKING DEVICE

FIELD OF THE INVENTION

The present invention is directed to a gathering and picking device with a gathering element that is arranged on a first side of a picking gap and a conveying element is arranged on the second side of the picking gap upstream from the inlet end of the picking gap, the gathering element and the conveying element rotate about predominantly vertical axes.

BACKGROUND OF THE INVENTION

U.S. Pat. No. 4,377,062 A describes a corn picker, in which a screw conveyor is arranged above the picking rolls. This screw conveyor conveys the plant stalks into and through the picking gap. A lower gathering wheel is located beneath the picking gap at the inlet side, i.e., the side of the picking gap located opposite the screw conveyor. An upper gathering wheel is arranged above the screw conveyor coaxially to the lower gathering wheel. The gathering wheels serve for conveying the plants into the picking gap.

DE 100 28 887 A describes another corn harvesting attachment, in which a gathering element that rotates about an approximately vertical axis and is provided with approximately radial carrier elements grasps the stalks of plants standing in a field and conveys said stalks along the picking gap of a picking device. Due to the utilization of a rotating gathering element, operating width is increased in comparison with conventional pickers that operate with gathering chains, since plants that stand laterally adjacent to the picking gap are also gathered. Since the gathering element also moves the plants through the picking gap, the structural length is relatively short. In order to prevent possible conveyance problems when the plants are introduced into the picking gap, another conveying element in the form of a screw conveyor or a chain conveyor that introduces the plants into the picking gap is arranged on the side of the picking gap located opposite the gathering element. However, conveyance problems may still arise under certain harvesting conditions.

SUMMARY OF THE INVENTION

It is an object of the present invention to provide an improved gathering and picking device.

A conveying element is arranged on the side of the picking gap located opposite the gathering element and assists in the introduction of the plants into the picking gap by the gathering element. The conveying element is rotated about a predominantly vertical axis.

This makes it possible to use a relatively flat conveying element such that the gathering device comprising the conveying element and the gathering element also has a very flat structure. The conveying element can be realized in less complex fashion than conventional screw conveyors and chain conveyors of the prior art. In addition, the weight and manufacturing costs of the conveying element are reduced, at the same time, the service life is extended. If the distance between the conveying element and the gathering element is made sufficiently small, it is also possible to realize a cleaning effect since the conveying element is able to remove plant residues from the gathering element.

The conveying element may be provided with protruding teeth-like carrier elements. These carrier elements may be arranged on the edge of a disk such that pocket-like recesses for accommodating the stalk of a plant (or several plants) are formed between the carrier elements. It would also be conceivable to use finger-like carrier elements that extend approximately radial and preferably have a repelling conveyance characteristic, i.e., they are curved in trailing fashion.

The plants are effortlessly conveyed into the picking gap by the conveying element that, like the gathering element, rotates about a predominantly vertical axis. This means that another conveying element that is arranged on the point of the picking roll and that extends in the vicinity of the picking gap usually can be eliminated. And it is only desirable that the ends of the picking rolls are located approximately beneath the inlet of the picking gap. The picking rolls can therefore be made shorter and manufactured more cost effectively. In addition, it is now possible to arrange the stripping plate closer to the ground. This provides certain advantages in the collection of lodged corn. The ends of the picking rolls on the inlet side may be provided with screw conveyors in order to simplify the introduction of the plants. However, it would also be conceivable to increase the length of at least one picking roll.

In order to improve the introduction of the plants into the picking gap by the cooperating gathering and conveying elements, it is practical if their operating envelopes overlap. This enables the two elements together to introduce the plant into the picking gap without problem.

In the region in which it conveys the plants together with the gathering element, the conveying element preferably has a conveying speed that is approximately the same as the speed of the gathering element at this location. A uniform, constant conveyance is achieved in this fashion. However, if the conveying element is arranged above the gathering element, its conveying speed may be faster than that of the gathering element such that the upper parts of the plants are inclined rearward and ears that might fall off the plants can also be collected by the gathering and picking device. Similarly, if the conveying element is arranged beneath the gathering element, its conveying speed may be slower than that of the gathering element. If the conveying element comprises a section located above the gathering element and a section located beneath the gathering element, these sections may be driven at different speeds in order to incline the upper parts of the plants rearward.

In the illustrated embodiment, the gathering element conveys the plants over the effective length of the picking gap, i.e. the length over which the plants are taken up the picking unit. In another embodiment, an additional conveyor may also be provided downstream of the gathering element. Such an additional conveyor is particularly practical if the length of the picking gap is greater than the operating width of the gathering element. Such a conveyor may be of the same type as the gathering element. It would also be conceivable to utilize a screw conveyor or a chain conveyor. The conveyor may also be realized in the form of a spiral conveyor that is arranged on the picking rolls and may also extend over its entire length.

In the illustrated embodiment, the conveying element is arranged above the picking gap. However, it would also be conceivable to arrange the conveying element beneath the picking gap or to arrange one conveying element above and one conveying element below the picking gap.

Since the plants are conveyed along the picking gap by the gathering element, it is sufficient for the conveying element to end approximately at the inlet of the picking gap. This makes it possible to reduce the dimensions of the conveying element.

DETAILED DESCRIPTION

Figure 1:
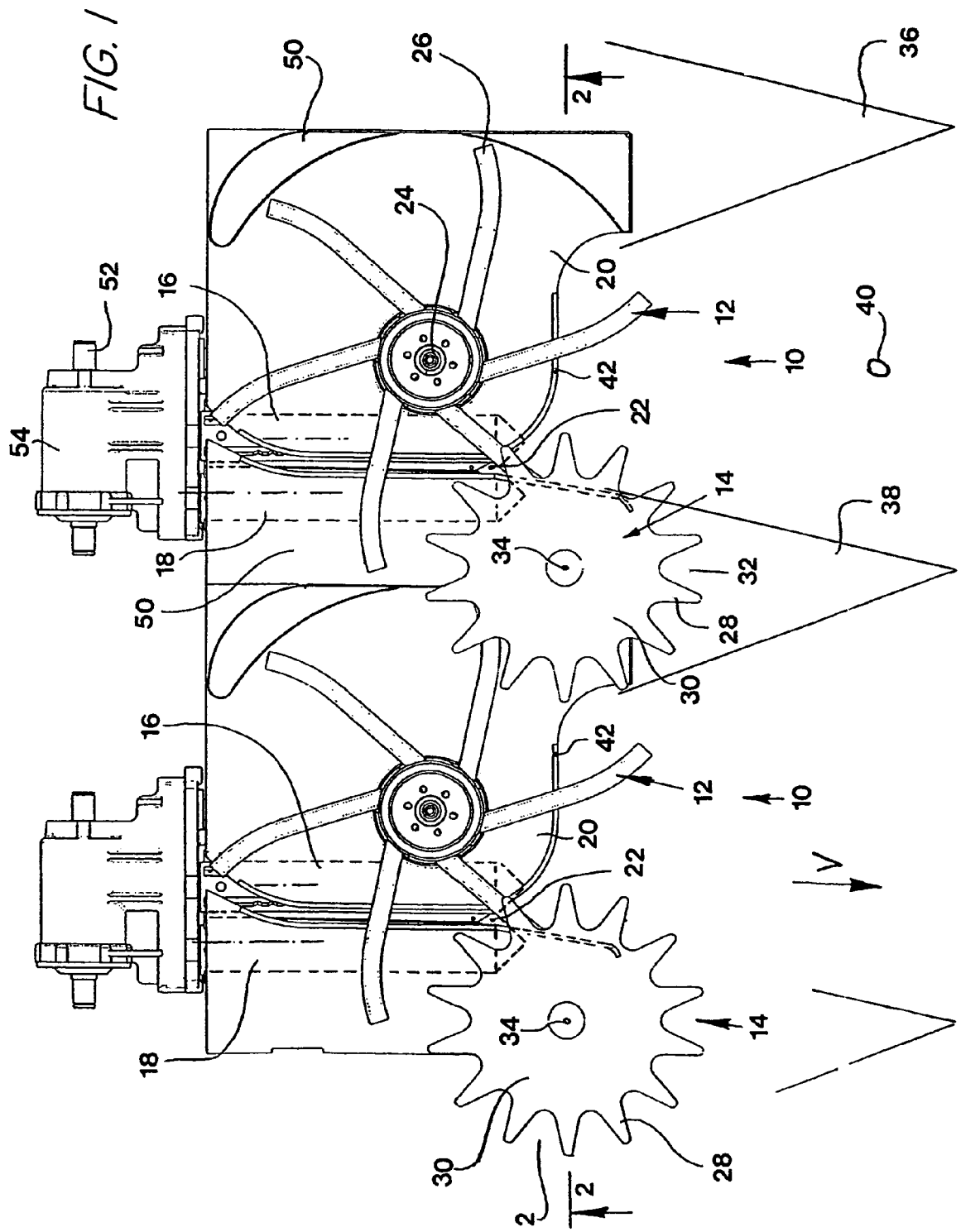
FIG. 1, is a schematic top view of two gathering and picking devices of a corn picking attachment.

Two gathering and picking devices 10 of a corn picking attachment for a combine are illustrated in FIG. 1. A complete corn picking attachment usually comprises a series of gathering and picking devices 10. However, it would also be conceivable for the corn-picking attachment to be provided with only one gathering and picking device 10.

The gathering and picking device 10 contains a gathering element 12 for grasping and taking in the plants to be harvested, a conveying element 14, a first picking roll 16 and a second picking roll 18, wherein the picking rolls are arranged beneath a picking gap 22 located in a stripping plate 20.

Figure 3:
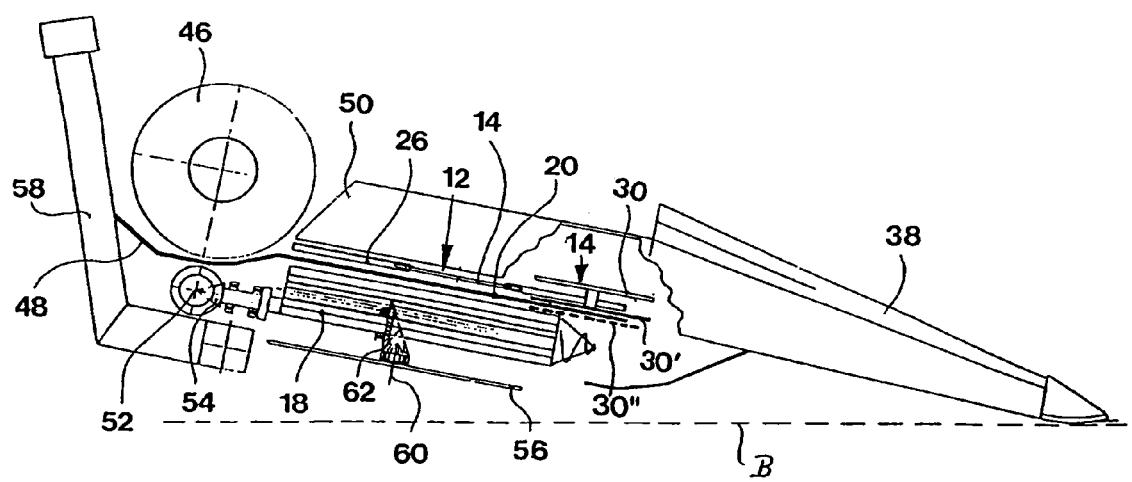
FIG. 3 is a schematic side view of the gathering and picking device of FIG. 1.

Relative to the forward driving direction V, the gathering element 12 is located on the left side of the picking gap 22 and the conveying element 14 is arranged on the right side of the picking gap 22. The gathering element 12 and the conveying element 14 are arranged such that they are rotatable about predominantly vertical and parallel axes and can be rotated by their assigned drives (not shown in the figures). According to FIG. 1, the gathering element 12 rotates clockwise and the conveying element 14 rotates counterclockwise. Relative to the forward driving direction V, the axis of rotation of the conveying element 14 is arranged in front of the picking gap 22 on the inlet side. The gathering element 12 and the conveying element 14 are arranged above the stripping plate 20 and, in particular, have axes of rotation that are slightly inclined forward relative to the forward driving direction V since the stripping plate 20 is slightly inclined forward and downward relative to the ground B during the operation of the device, as indicated in FIG. 3.

The gathering element 12 comprises a shaft 24 that defines the axis of rotation and finger-like carrier elements 26 that extend essentially radially and are distributed over the circumference of the shaft. These carrier elements are curved opposite to the direction of rotation in their plane, i.e. they are curved in trailing fashion. Thus, the carrier elements 26 have a repelling conveyance characteristic.

Alternatively or in addition to the curvature of the fingers 26, it would also be conceivable to realize a controlled radial and/or azimuthal movement of the fingers 26 relative to the shaft 24 as is known, for example, from the ratchet-like prongs or fingers on screw conveyors of cutting mechanisms. In this case, a repelling conveyance characteristic could be achieved with the aid of a cam control or the like.

Figure 2:
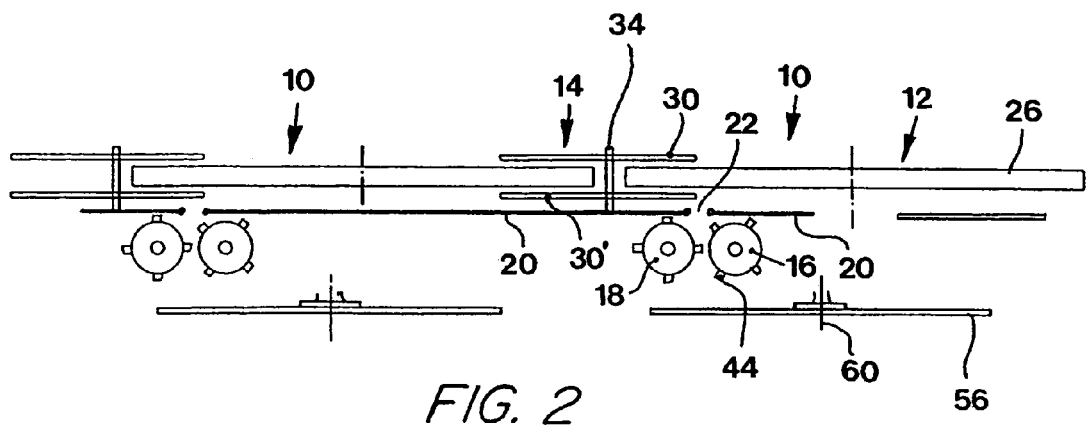
FIG. 2 is a cross sectional view through the gathering and picking device of FIG. 1 along line 2—2.

The conveying element 14 comprises a disk 30 that is equipped with teeth-like carrier elements 28. Pocket-shaped recesses 32 are left between the carrier elements 28. According to FIG. 2, the conveying element 14 is composed of two disks 30 and 30' that are rigidly connected and arranged coaxially one on top of the other. These disks are connected by a shaft 34 that defines the axis of rotation, wherein the carrier elements 28 of the disks 30 and 30' lie exactly one on top of the other. Viewed in the vertical direction, the lower disk 30' is arranged between the stripping plate 20 and the carrier elements 26 of the gathering element 12, and the upper disk 30 is located above the carrier elements 26. This makes it possible for the carrier elements 26 of the gathering elements 12 to overlap the carrier elements 28 of the conveying element 14 without colliding.

It would also be conceivable to arrange another disk 30" beneath the picking gap 22, wherein this disk is provided alternatively or in addition to the other disks 30 and 30'.

According to FIG. 1 which shows a top view of the gathering and picking device 10, stalk dividers 36 and 38 are arranged upstream of the gathering elements 12 and 14 relative to the forward driving direction V of the harvester. These stalk dividers press and bend inwardly plants 40 that are not precisely located in front of the gathering element 12 while the gathering and picking device 10 is moved over the field in the forward direction, such that these plants reach the effective range of the gathering elements 12. The leading edge 42 of the stripping plate 20 relative to the forward driving direction V is also curved in such a way that the stalks of the plants 40 are pressed into the effective range of the gathering element 12. The operating envelope of the gathering elements 12 are so large that in cooperation with the curved leading edge 42 of the stripping plate 20 and the stalk dividers 36 and 38, the gathering and picking device 10 operates independently of the planted rows. The operating width of the gathering and picking device 10 consequently corresponds to the lateral spacing between the points of the stalk dividers 36 and 38.

The first picking roll 16 is arranged on the side of the picking gap 22 that is also provided with the gathering element 12 and is inclined slightly forward and down. Relative to the lateral direction, the first picking roll is oriented parallel to the forward driving direction V. Relative to the vertical direction, the first picking roll 16 is arranged beneath the stripping plate 20. The second picking roll 18 is located on the other side of the picking gap 22 and is structurally identical to the first picking roll 16. The gap defined between the first picking roll 16 and the second picking roll 18 is arranged vertically beneath the picking gap 22. The picking rolls 16 and 18 are equipped with gripping ribs 44 that extend over the length of the picking rolls and are driven in opposite directions, such that a picking unit is formed which draws the plants 40 down into the picking gap 22. The stripping plate 20 serves for stripping the fruit off the plants 40 as the plant passes through the picking gap 22.

Relative to the forward driving direction V, the inlet of the picking gap 22 lies upstream of the axis of rotation of the gathering element 12 at the location where the spacing between the two parts of the stripping plate 20 initially becomes narrower and assumes a constant distance over the length of the picking gap 22. The end region of the picking gap 22 is, however, curved in the direction of the axis of rotation of the gathering element 12.

The function of the gathering elements 12 and the conveying elements 14 is illustrated quite clearly in FIG. 1. The stalk of a plant 40 standing in the field comes in contact with a gripping element 26 of the gathering element 12, after having been bent in the direction of the picking gap 22 by the stalk dividers 36 and 38 and/or the leading edge 42 of the stripping plate 20 (depending on its lateral position). The stalk is carried along by the leading surface of the gripping element 26 and pressed toward the end of the picking gap 22 due to the trailing, and hence repelling, curvature of the gripping element 26. The stalk of the plant 40 is conveyed into the picking gap 22 by the gripping element 26 in this way, wherein the picking gap extends at least approximately parallel to the forward driving direction V and is vertically located in the stripping plate 20 between the picking rolls 16 and 18 and the gathering element 12. This also causes the plant 40 that is not yet separated from the soil of the field to bend. If necessary, the plant may then be separated from the soil by means of a chopping knife 56 (see FIG. 3) arranged beneath the picking rolls 16 and 18.

When the plants 40 are introduced into the picking gap 22, the angle between the carrier elements 26 of the gathering element 12 and the opposing edge of the stripping plate 20 (shown on the left in FIG. 1) is relatively obtuse. The stalks of the plants 40 may be pinched off due to this obtuse angle between the stripping plate 20 and the carrier elements 26, particularly, when harvesting very ripe, and thus soft, stalks of corn plants. In this case the gathering and picking device 10 becomes clogged.

This problem is solved by the conveying element 14. The stalk of a plant 40, grasped by a gripping element 26 of the gathering element 12, is pressed against the conveying element 14 by the gripping element 26 and accommodated in one of the pocket-like recesses 32. The conveying speed (circumferential speed of the carrier elements 28) may be slightly faster than that of the gathering element 12, at least if only an upper disk 30 of the conveying element 14 is used. However it is preferred that the carrier elements 26 and 28 have approximately the same conveying speed in the region in which they overlap. The conveying element 14 and the gathering element 12 move the plant 40 rearward into the picking gap 22. Here, the upper part of the plant is bent rearward in the picking gap 22 relative to the conveyance direction if the upper disk 30 of the conveying element 14 operates with a faster conveying speed. Thus, parts of the fruits which may fall off the plants due to the resulting acceleration do not drop to the ground, but rather into the effective range of the conveying device 12 that feeds these parts of the crop to a screw conveyor 46. Since the conveying element 14 only extends approximately to the inlet of the picking gap 22, it does not convey the plants 40 along the picking gap 22; the gathering element 12 is provided for this purpose.

Plants 40 located on the right side of the picking gap 22 relative to the driving direction V can also be grasped, conveyed transverse to the driving direction V and introduced into the picking gap 22 by the conveying element 14. For this purpose, the divider points 36 and 38 could be made narrower at least on the side that faces the gathering element 14. In addition or alternatively, the stripping plate 20 may be cut out to a greater extent than that shown in the figures beneath the conveying element 14, such that the latter protrudes farther beyond the divider points 36 and 38. In addition, the stripping plate 20 and/or the gathering element 14 may have a larger radius than that shown in the figures and an axis of rotation that lies farther forward. Due to these measures, plants 40 can be introduced into the picking gap 22 on either side of the picking gap 22 by the gathering element 12 and the conveying element 14.

The stalk of the plant 40 is conveyed into the effective range of both picking rolls 16 and 18 by the gathering element 12 and the conveying element 14, wherein the front points of the picking rolls (relative to the forward driving direction V) lie beneath the inlet region of the picking gap 22. The points of the picking rolls 16 and 18 are conical in shape. They may also be provided with an endless screw in order better to introduce the plants 40 into the picking gap 22. During the picking process, the carrier elements 26 of the gathering element 12 convey the plants 40 over the length of the picking gap 22. The rotational speeds of the picking rolls 18 and 20 and of the gathering element 12 are preferably selected such that the entire plant 40 is pulled downward into the picking gap 22 when it reaches the end of the picking gap 22.

The useful parts of the plant 40 separated by means of the picking device, e.g. ears of corn, crops of sunflowers, etc., are conveyed into a trough 48 arranged on the rear side of the gathering and picking device 10 by the gathering element 12. A cover 50 defines a channel leading to the trough 48 on both sides of the picking gap 22. The useful parts of the plants 40 are conveyed through this channel. The cover 50 partially covers the gathering elements 12 and improves the functional and operational reliability of the gathering and picking device 10 due to its shielding effect. The trough 48 may be formed integrally with the stripping plate 20 or in the form of a separate component. The screw conveyor 46 that is arranged above the trough 40 and oriented transverse to the forward driving direction conveys the useful parts to a harvesting vehicle (e.g., a combine or field chopper) or onto a trailer. A shaft 52 that serves for driving the two picking rolls 16 and 18, the chopping knife 56 and the gathering and conveying elements 12 and 14 of the gathering and picking devices 10 via gears 54 is arranged beneath the trough 48. The shaft 52 is connected to and driven by the engine of a motor vehicle that carries the harvester. A frame 58 carries the gathering and picking devices 10 of the harvester, all of which are driven by the shaft 52.

The remains of the plants 40 which are conveyed downward by the picking rolls 16 and 18 reach the effective range of the rotating four-armed chopping knife 56 and are chopped into individual pieces, returning the chopped plant remains to the field. The picking rolls 16 and 18 hold the plant 40 during the chopping process. The chopping knife 56 rotates about a vertical axis of rotation 60 arranged between the axis of rotation of the gathering element 12 and the screw conveyor 44 relative to the forward driving direction V, as indicated in FIG. 3, wherein said chopping knife is driven by the shaft 52 via a gear 62. The chopping knife 56 is positioned beneath the picking rolls 16 and 18. With respect to FIG. 1, the chopping knife 56 rotates in a clockwise direction such that the chopped plant remains are thrown laterally rearward.

Having described the illustrated embodiment, it will become apparent that various modifications can be made without departing from the scope of the invention as defined in the accompanying claims.

The invention claimed is:

1. A gathering and picking device for standing plants having useful parts comprising:
   a picking gap defined by a stripper plate, the picking gap comprising an inlet portion for receiving standing plants and having a first side and a second side opposite the first side;
   a gathering element is mounted for rotation on the first side of the picking gap and is rotated about a predominantly vertical axis, the gathering element is provided with elongated carrier elements that are designed to grasp the standing plants as the gathering and picking device is being operated, the gathering element having a first operating envelope;
   a conveying element comprises a series of teeth radially projecting from a generally circular core to a lesser radial extent than the elongated carrier elements and cooperates with the gathering element to introduce the standing plants into the picking gap, the conveying element is mounted for rotation on the second side of the picking gap upstream of the inlet portion of the picking gap, to convey the standing plants over at least part of the length of the picking gap, the conveying element is rotated about a predominantly vertical axis, the conveying element having a second operating envelope partially overlapping with the first operating envelope; and a picking unit is operated to convey the standing plants downward through the picking gap so the useful parts of the standing plants are separated from the standing plants by the stripper plate.

2. The gathering and picking device as defined by claim 1 wherein the carrier elements of the conveying element are distributed circumferentially over a disk.

3. The gathering and picking device as defined by claim 2 wherein pocket-like recesses are formed between the carrier elements of the conveying element.

4. The gathering and picking device as defined by claim 1 wherein the picking unit comprises at least one picking roll having a point, the point is arranged beneath the inlet portion of the picking gap.

5. The gathering and picking device as defined by claim 1 wherein the conveying element is rotated faster than the gathering element is rotated.

6. The gathering and picking device as defined by claim 1 wherein the conveying element is rotated at approximately the same speed the gathering element is rotated.

7. The gathering and picking device as defined by claim 1 wherein the conveying element is arranged above the picking gap.

8. The gathering and picking device as defined by claim 1 wherein the conveying element is arranged below the picking gap.

9. The gathering and picking device as defined by claim 1 wherein the conveying element is arranged above and below the picking gap.

10. The gathering and picking device as defined by claim 1 wherein the conveying element is arranged beneath the gathering element.

11. The gathering and picking device as defined by claim 1 wherein the conveying element is arranged above the gathering element.

12. The gathering and picking device as defined by claim 1 wherein the conveying element is arranged above and beneath the gathering element.

13. The gathering and picking device as defined by claim 1 wherein the second operating envelope terminates approximately at the inlet portion of the picking gap.

14. The gathering and picking device as defined by claim 1 wherein the teeth are generally triangular.

15. The gathering and picking device as defined by claim 1 wherein the teeth are generally triangular with rounded peaks.

* * * * *